United States Patent [19]

Hoppe et al.

[11] Patent Number: 5,405,947
[45] Date of Patent: Apr. 11, 1995

[54] TRIAZINE RING-CONTAINING REACTIVE DYESTUFFS, THEIR PREPARATION AND USE

[75] Inventors: Manfred Hoppe; Eckhard Bock, both of Kürten-Bechen; Wolfram Reddig, Berg.-Gladbach; Thomas Eizenhöfer, Cologne; Wolfgang Harms, Odenthal; Karl-Josef Herd, Odenthal-Holz, all of Germany

[73] Assignee: Bayer Aktiengesellschaft, Leverkusen, Germany

[21] Appl. No.: 54,115

[22] Filed: Apr. 27, 1993

[30] Foreign Application Priority Data

May 4, 1992 [DE] Germany ............... 42 14 740.9

[51] Int. Cl.[6] .................. C09B 62/002; C09B 62/04; C09B 62/503; D06P 1/38
[52] U.S. Cl. .................. 534/618; 540/126; 544/76; 544/189; 558/29; 564/218; 564/440
[58] Field of Search .......... 534/618; 540/126; 544/76, 189

[56] References Cited

U.S. PATENT DOCUMENTS 4,754,023 6/1988 Tzikas et al. ............... 534/618

FOREIGN PATENT DOCUMENTS

| 0074928 | 3/1983 | European Pat. Off. . |
| 0094055 | 11/1983 | European Pat. Off. . |
| 0070806 | 5/1985 | European Pat. Off. . |
| 0070807 | 5/1985 | European Pat. Off. . |
| 0318968 | 6/1989 | European Pat. Off. . |
| 1576237 | 10/1980 | United Kingdom . |

OTHER PUBLICATIONS

Derwent Abstract for JP 58-204,051, May 11, 1983, "Textiles; Paper; Cellulose"–P.12, Week 8402.
Negulescu, Chemical Abstracts, vol. 81, 1974, p. 36, 50515q.
Feldman et al, Chemical Abstracts, vol. 75, 1971, p. 31, 119130f.

*Primary Examiner*—Mary C. Lee
*Assistant Examiner*—Fiona T. Powers
*Attorney, Agent, or Firm*—Sprung Horn Kramer & Woods

[57] ABSTRACT

Reactive dyestuffs which, in the form of the free acid, have the following formula

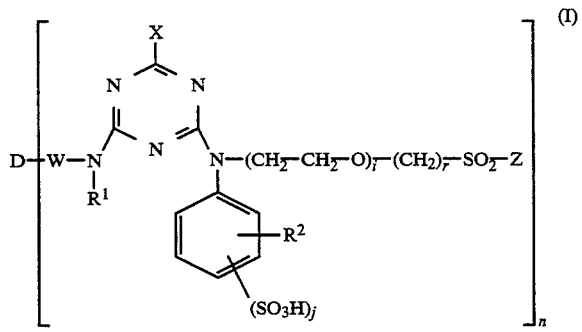

in which X denotes fluorine, chlorine or bromine and $SO_2$-Z denotes a specific reactive radical, the remaining substituents having the meaning given in the description, and show improved fixation yield in dyeing.

9 Claims, No Drawings

TRIAZINE RING-CONTAINING REACTIVE DYESTUFFS, THEIR PREPARATION AND USE

The invention relates to new reactive dyestuffs having a triazine and a specific vinylsulphone radical, to a process for their preparation and to their use.

Bifunctional reactive dyestuffs having a halogenotriazine and a vinylsulphone radical have already been disclosed, for example, in DE-A-2,614,550, EP-A-70,806, EP-A-70,807 and EP-A-74,928. These known bifunctional reactive dyestuffs still have various disadvantages in practical application, in particular with respect to the obtainable degree of fixation.

The present invention relates to new reactive dyestuffs which, in the form of the free acid, have the following formula

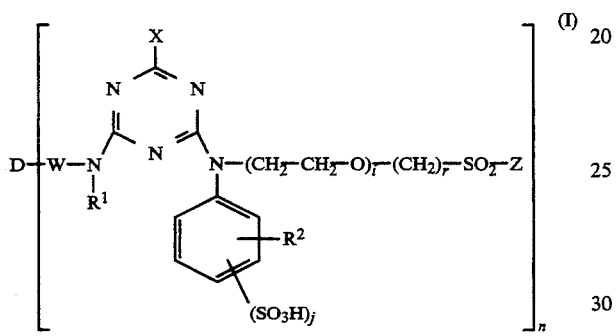

in which

D is the radical of an organic dyestuff from the anthraquinone, phthalocyanine, formazan, azomethine, dioxazine, phenazine, stilbene, triphenylmethane, xanthene, thioxanthone or nitroaryl series.

W is a direct bond or a bridging member
$R^1$ is H, $CH_3$ or $C_2H_5$
$R^2$ is H, $C_1$-$C_4$-alkyl, Cl, Br, $C_1$-$C_4$-alkoxy or COOH
i is 0 or 1
j is 0, 1 or 2
r is 2 or 3
X is F, Cl or Br
Z is $-CH=CH_2$, $-CH_2-CH_2-OSO_3H$, $-CH_2-CH_2-S_2O_3H$, $-CH_2-CH_2-O-CO-CH_3$, $-CH_2-CH_2-OPO_3H_2$, $-CH_2-CH_2-OH$,
n is 1 or 2.

A suitable radical D of an organic dyestuff is in particular one containing one or more water-solubilising groups, in particular sulpho groups and/or having no further fibre-reactive radical.

X is in particular F or Cl.

In regard to the alkyl, aryl, aralkyl, hetaryl, alkoxy, halogen and acylamino radicals mentioned in the present application and in regard to the bridging members, the following applies:

Alkyl groups are understood to mean in particular those having 1 to 4 C atoms, which groups can, if desired, have substituents, for example halogen such as Cl or Br, OH, CN or $OSO_3H$.

Alkoxy radicals are understood to mean in particular those having 1 to 4 C atoms.

Halogen is understood to mean in particular chlorine or fluorine.

Acylamino radicals are understood to mean in particular those having 1 to 4 C atoms, such as formylamino, acetylamino, propionylamino, n-butyrylamino.

Examples of suitable bridging members W are:

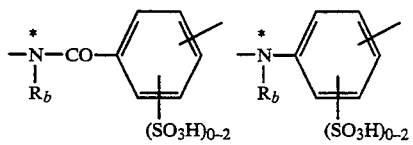

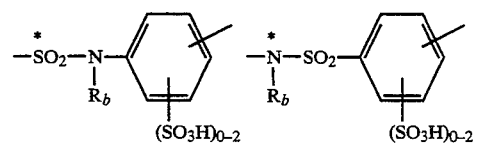

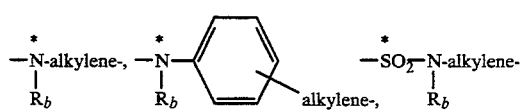

$-O$-alkylene-, alkylene-, $-$alkylene-CO$-$, $-$alkylene-$SO_2-$,

\* designating the atom or the group linked to the chromophore D and $R_b$ representing hydrogen or $C_1$-$C_4$-alkyl.

The present invention furthermore relates to the preparation of the reactive dyestuffs of the formula (I) by methods known per se:

a) either by condensation of dyestuffs of the formula

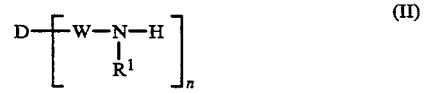

in which

D, W, $R^1$ and n have the abovementioned meaning, with n moles of trihalogenotriazines of the formula

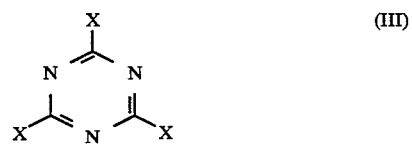

to give compounds of the formula

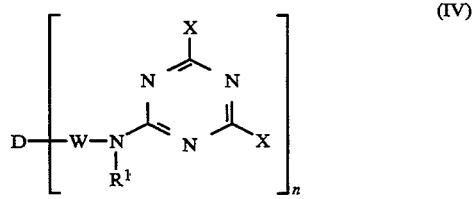

and further condensation of the compounds of the formula (IV) with n moles of the components of the formula

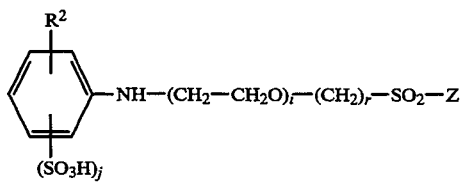

(V)

in which

R², i, j, r, X and Z have the abovementioned meaning,
or b) in reverse order by condensation of trihalogenotriazines of the formula (III) with the components of the formula (V) to give the primary condensation products

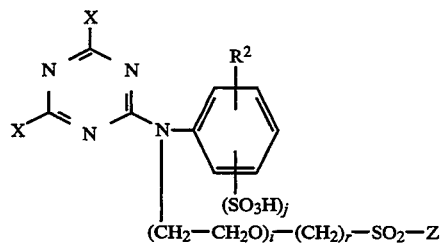

(VI)

in which

X, i, R², j, r and Z have the abovementioned meaning, and further condensation of n moles of the compounds of the formula (VI) with the dyestuffs of the formula (II), or c) by condensation of suitable precursors with the trihalogenotriazines (III) and the components of the formula (V) or by condensation of suitable precursors with the primary condensation products of the formula (VI), followed by dyestuff synthesis.

The invention furthermore relates to compounds (V) and to a process for the preparation of compounds (V) and to intermediates useful for this preparation and having the general formula

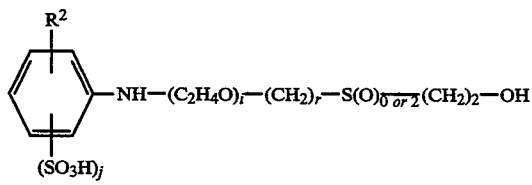

including their salts and their reaction products containing protective groups, in which R², Z, j, r have the meaning given under formula (I), with the exception of the compound of the formula

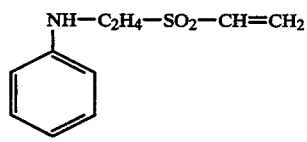

described by D. Feldman and I. Negulescu in Bul. Inst. Politeh. Iasi 16 (1970) 213–220 (CA 75: 119130f) and by I. Negulescu in RO 59096 of 15th November 1973 (CA 81: 50515q) as the monomer in an acrylonitrile/vinylsulphone copolymer.

Particular preference is given to compounds in which

R² denotes H j, i denote 0 r denotes 2.

The compounds of the formula (V) can be prepared by sulphation of compounds of the formula

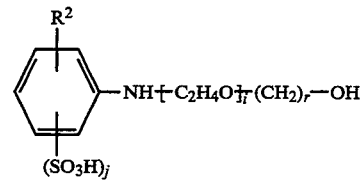

followed by reaction with mercaptoethanol to give

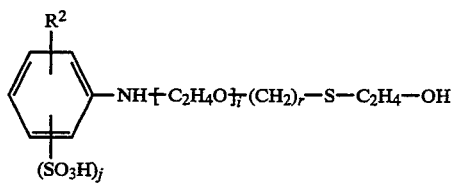

and, if desired blocking of the NH group with a protective group, in particular acetyl, and oxidation, in particular using $H_2O_2$, to give

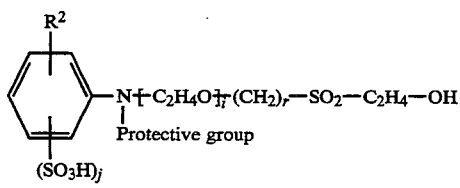

and, if desired elimination of the protective group to give

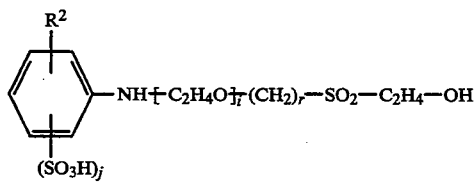

and, if desired, customary conversion of the radical $SO_2C_2H_4$—OH into the vinylsulphonyl group or conversion of the —$CH_2$—$CH_2$—OH group into the remaining detachable groups listed under Z.

The condensations of the starting components with the trihalogenotriazines are carried out irrespective of the order in aqueous or organic-aqueous media in the presence of acid-binding agents. Depending on the nature of the starting components, the first condensation step is carried out in pH ranges from 2 to 8, preferably 3 to 7, and at temperatures from 0° to 40° C., preferably 0° to 25° C. The exchange of the second halogen atom of the triazine is effected in a pH range from 4 to 10, preferably 5 to 9, and in a temperature range from 0° to 60° C., preferably 0° to 30° C.

Examples of acid-binding agents are carbonates, hydroxides or phosphates, such as sodium carbonate, sodium bicarbonate, dilute sodium hydroxide solution, disodium phosphate or trisodium phosphate or sodium fluoride.

If the condensation or the dyestuff synthesis is to result directly in a dyestuff solution or a liquid dyestuff preparation, the use of lithium carbonates or lithium hydroxide either alone or together with solubilising agents and/or stabilising buffer systems may be advantageous. Other conversion reactions of the dyestuffs or precursors thereof, such as metallisation reactions, sulphonations or introduction of acylamino groupings can in general be carried out at any desired step of the dyestuff syntheses.

Particularly valuable dyestuffs of this series are water-soluble formazan, anthraquinone and phthalocyanine dyestuffs, and in particular those having sulpho and/or carboxyl groups. The dyestuffs can be either metal-free or metal-containing, the preferred metal complexes being copper complexes, nickel complexes, chromium complexes and cobalt complexes.

Suitable dyestuff radicals D or amino-containing dyestuffs on which the dyestuffs of the formula (I) are based have been described in the literature in very large numbers. The following examples may be mentioned:

EP-A-54,515, EP-A 69,703, EP-A 70,807, DE-A 3,222,726, DE-A 2,650,555, DE-A 3,023,855, DE-A 2,847,939, DE-A 2,817,780, GB-A 2,057,479, DE-A 2,916,715, DE-A 2,814,206, DE-A 3,019,936, EP-A 45,488 and Venkataraman: The Chemistry of Synthetic Dyes, vol. VI, chapter II, p. 211–325, New York, London; 1972.

Preference is given to reactive dyestuffs which, in the form of the free acid have the following formula (VII)

in which

D is the radical of an organic dyestuff from the anthraquinone, phthalocyanine, formazan, azomethine, dioxazine, phenazine, stilbene, triphenylmethane, xanthene, thioxanthone or nitroaryl series. A particularly suitable radical of an organic dyestuff is one containing one or more water-solubilising groups, in particular sulpho groups, but no further fibre-reactive radicals.

$R^1$ is H, $CH_3$ or $C_2H_5$
$R^2$ is H or $CH_3$, $C_2H_5$
W is a direct bond or a bridging member
i is 0 or 1
j is 0 or 1
X is F or Cl
Z is $CH_2$—$CH_2$—$OSO_3H$, $CH=CH_2$ and
n is 1 or 2.

Particular preference is given to reactive dyestuffs which, in the form of free acid, have the following formula (VIII)

in which

D is the radical of an organic dyestuff from the anthraquinone, phthalocyanine, formazan or dioxazine series which dyestuff contains no further fibre-reactive groups.
X is F, Cl,
Z is —$CH_2$—$CH_2$—$OSO_3H$,
$R^1$ is H, $CH_3$ or $C_2H_5$,
n is 1.

Preferred dyestuffs are those of the formulae (1) to (52) below, in which in general B includes a radical of the formula (VIa)

and W, $R^1$, X, i, $R^2$, j and Z have the abovementioned meaning.

(1)

(2)

in which
$R^{10}$ is H, methyl, methoxy, chlorine
$R^{11}$ is H, $SO_3H$ and
$R^{12}$ is H, methyl or ethyl.

(3)

in which

A represents a substituted or unsubstituted phenylene or a substituted or unsubstituted aromatic-aliphatic bridging member or straight-chain or branched $C_1$–$C_6$-alkylene which may be interrupted by groupings containing hetero atoms such as $NR^{13}$, O or S and substituted by $C_1$–$C_6$-alkoxy, $OSO_3H$, $SO_3H$, COOR or halogen, it also being possible for the group $NR^{13}$ within a bridging member A to form a heterocyclic aliphatic ring with the group $NR_b$, in particular E is

or O and $T_1$, $T_2$, independently of one another, are H, Cl, Br, $C_1$–$C_2$-alkyl, $OCH_3$, $OC_2H_5$, acylamino, $C_1$–$C_2$-alkoxycarbonyl, $R^{13}$, $R^{14}$, independently of one another, are H, $C_1$–$C_4$-alkyl, which may be substituted by OR, $OSO_3H$, $SO_3H$, COOR or halogen, R is H, $CH_3$ or $C_2H_5$.

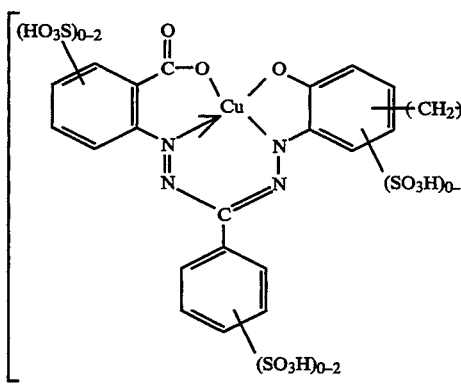

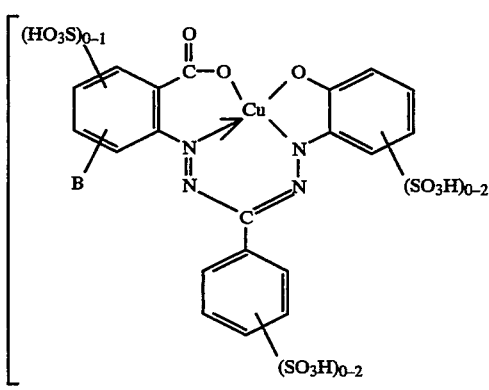

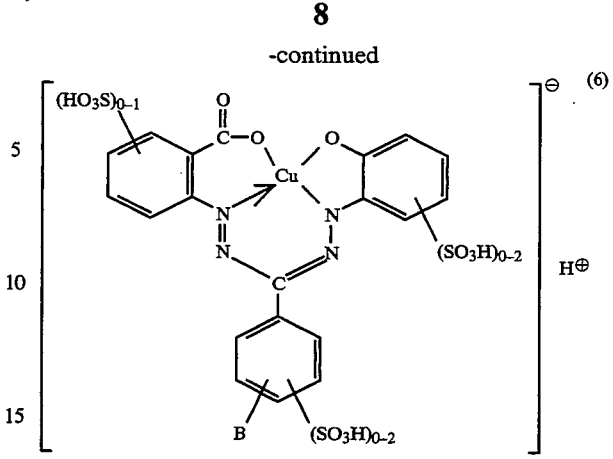

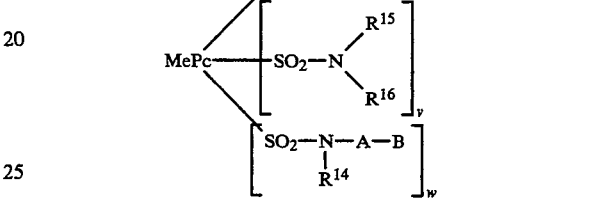

in which
Me is Cu, Ni
Pc is the radical of a phthalocyanine
u+v+w is 3.4–4.0, with the proviso that
u is 0.8–2.0,
v is 0–1.0,
w is 1.0–3.0 and
A has the abovementioned meaning,
$R^{14}$ has the abovementioned meaning,
$R^{15}$ and $R^{16}$ are H, $C_1$–$C_2$-alkyl which is unsubstituted or substituted by OH, $OSO_3H$, $SO_3H$ or COOH.

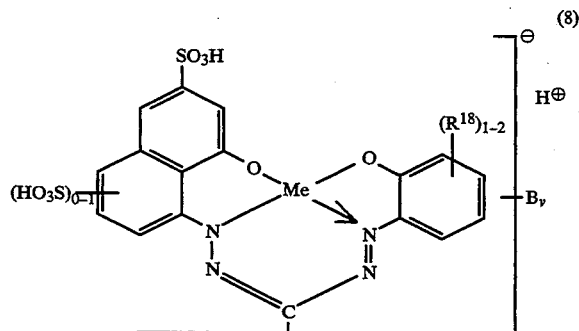

in which
v, w are 0 or 1, w not being equal to v,
$R^{18}$, $R^{17}$, independently of one another, are H, $C_1$–$C_4$-alkyl, $C_1$–$C_4$-alkoxy, OH, halogen, COOH, $NO_2$, $SO_3H$, sulphonamido, $C_1$–$C_4$-alkylcarbonylamino, substituted or unsubstituted phenylcarbonylamino, $C_1$–$C_4$-alkylsulphonylamino, substituted or unsubstituted phenylsulphonylamino.

In a particularly preferred embodiment, W in formulae (1) to (8) denotes a single bond.

The reactive dyestuffs of the formula (I) are suitable for the dyeing and printing of a wide range of substrates, such as silk, leather, wool, synthetic polyamide fibres, but in particular cellulose-containing materials of fibrous structure, such as linen, cellulose, regenerated cellulose and, in particular, cotton. They are not only suitable for the exhaust method but also for dyeing by the customary pad-dyeing methods, in which the material is impregnated with aqueous dyestuff solutions which, if desired, may also contain salt, and the dyestuffs are fixed after an alkali treatment or in the presence of alkali, if appropriate with the application of heat.

The reactive dyestuffs of the formula (I) are distinguished by high reactivity and excellent fixation properties. Owing to their bifunctionality, they produce high fixation yields even from a long liquor. They are characterised by a relative independence of the tinctorial strength from the dyeing temperature and can therefore be used in the exhaust method at low to medium dyeing temperatures. When used in the pad-steam process, they require only short steaming times. They produce dyeings of high colour strength in combination with good light and wetfastness properties.

EXAMPLE 1

A) 0.15 mol of the compound of the formula (for preparation, see Example 38 ff)

are mixed with 100 parts of water and 100 parts of ice, and the resulting mixture is made neutral using $Na_2CO_3$. 0.17 mol of 2,4,6-trifluoro-1,3,5-triazine are added dropwise to the solution over a period of 10 minutes while maintaining the pH at 4.5 to 5. This gives 250 parts of a condensation solution of the following compound

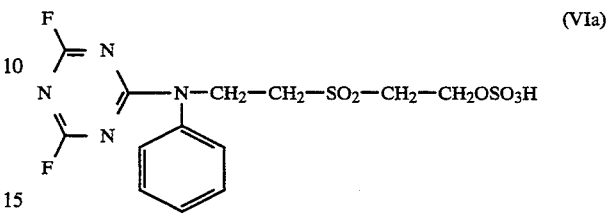

(VIa)

B) 0.1 mol of the copper complex of N-(2-carboxy-5-sulphophenyl)-N'-(2'-hydroxy-3'-amino-5'-sulphophenyl)-ms-phenylformazan disodium salt is dissolved in 600 ml of water. After cooling to 0° to 5° C., the solution of the component prepared in Example 1A is run in while maintaining the pH at 7.0 to 8.0 by addition of sodium carbonate solution. After 2 hours, the temperature is allowed to rise gradually to 20° C. and, after condensation is complete, the dyestuff is salted out, filtered off with suction and, after buffering at a pH of 6, dried at 45° C. in vacuo.

The dyestuff has the formula

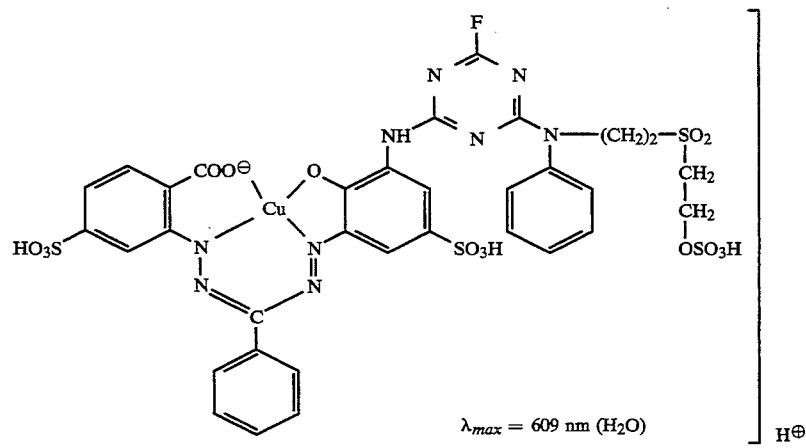

$\lambda_{max}$ = 609 nm ($H_2O$)

(V)

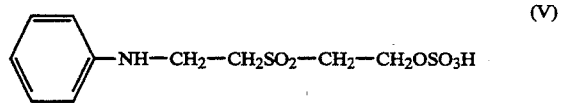

and dyes cotton from a long liquor in blue hues at very good fixation yields.

Further blue formazan dyestuffs are obtained by condensation of the following components:

| No. | Aminoformazan | Trihalogeno-triazine | Component of the formula (V) | Hue | $\lambda_{max}$ ($H_2O$) |
|---|---|---|---|---|---|
| 2 | N-(2-Carboxy-5-sulphophenyl)-N'-(2'-hydroxy-5'-amino-3'-sulphophenyl)-ms-(2''-sulphophenyl)-formazan, Cu complex | ![F-triazine] | $HN-(CH_2)_2-SO_2-CH_2-CH_2-OSO_3H$ (phenyl) | blue | |

-continued

| No. | Aminoformazan | Trihalogeno-triazine | Component of the formula (V) | Hue | $\lambda_{max}$ (H$_2$O) |
|---|---|---|---|---|---|
| 3 | N-(2-Hydroxy-3-amino-5-sulpho-phenyl)-N'-(2'-hydroxy-4'-sulphophenyl)-ms-(2''-sulpho-phenyl)-formazan, Cu complex | 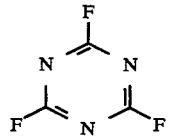 | " | navy | |
| 4 | N-(2-Carboxy-5-sulphophenyl)-N'-(2'-hydroxy-5'-amino-3'-sulphophenyl)-ms-(4''-sulpho-phenyl)-formazan, Cu complex | 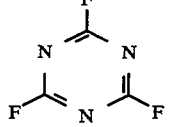 | " | blue | |
| 5 | N-(2-Carboxy-4-sulphophenyl)-N'-(2'-hydroxy-3'-amino-5'-sulphophenyl)-ms-phenyl-formazan, Cu complex | 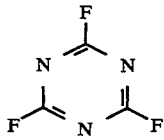 | " | blue | 598 nm |
| 6 | N-(2-Carboxy-5-sulpho-phenyl)-N'-(2'-hydroxy-3'-amino-5'-sulphophenyl)-ms-phenylformazan, Cu complex | 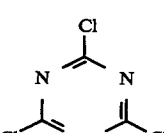 | HN—(CH$_2$)$_2$—SO$_2$—CH$_2$—CH$_2$—OSO$_3$H (phenyl) | blue | 607 nm |
| 7 | N-(2-Carboxy-4-sulpho-phenyl)-N'-(2'-hydroxy-3'-amino-5'-sulphophenyl)-ms-phenylformazan, Cu complex | 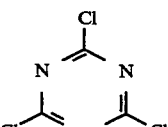 | " | blue | 595 nm |
| 8 | N-(2-Hydroxy-3-amino-5-sulphophenyl)-N'-(2'-carboxy-4'-sulphophenyl)-ms-(2''-chloro-5''-sulphophenyl)-formazan, Cu complex | 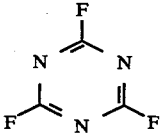 | NHCH$_2$—CH$_2$—SO$_2$—CH$_2$CH$_2$OSO$_3$H (phenyl) | blue | |
| 9 | N-(2-Hydroxy-5-amino-3-sulphophenyl)-N'-(2',5'-disulphophenyl)-ms-phenyl-formazan, Cu complex | 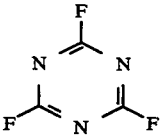 | " | blue | |
| 10 | N-(2-Carboxy-5-sulphophenyl)-N'-(2'-hydroxy-3'-amino-5'-sulphophenyl)-ms-(2'',-sulpho-phenyl)-formazan, Cu complex | 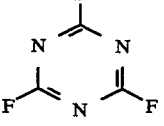 | NHCH$_2$—CH$_2$—SO$_2$—CH$_2$CH$_2$OSO$_3$H (phenyl) | blue | |
| 11 | N-(2-Carboxy-5-sulphophenyl)-N'-(2'-hydroxy-3',5'-disulpho-phenyl)-ms-(3''-aminophenyl)-formazan, Cu complex | 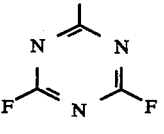 | " | greenish blue | |
| 12 | N-(2-Carboxy-5-sulphophenyl)-N'-(2'-hydroxy-3'-amino-5'-sulphophenyl)-ms-(2''-sulpho-phenyl)-formazan, Cu complex | 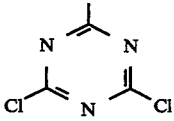 | " | blue | 600 nm |

EXAMPLE 13

0.1 mol of the anthraquinone of the formula ethanol, isolated and dried, giving about 200 g of a reactive dyestuff of the formula

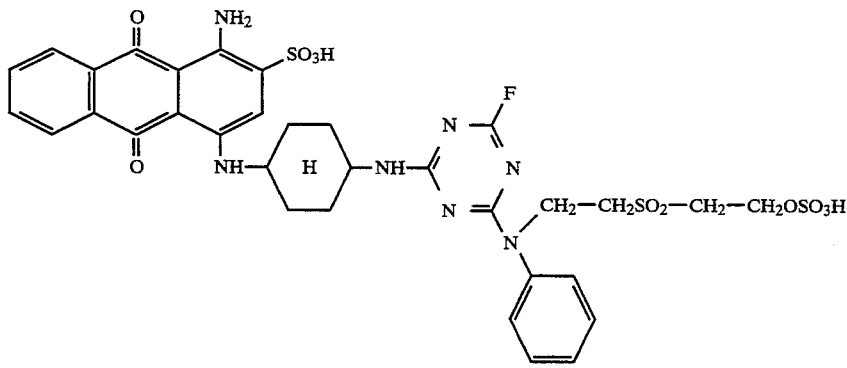

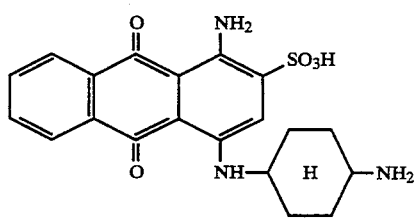

was dissolved in about 1000 parts of water at a pH of 12 to 13 using potassium hydroxide solution. The dyestuff solution was clarified, and 200 parts of hexahydro-2H-azepin-2-one were added. 0.15 mol of the condensation solution prepared in Example 1A was added dropwise over a period of 1 hour while maintaining a pH of 8 to 9 at 20° C. For the most part, the reaction was complete after 8 hours. The dyestuff was precipitated by means of ($\lambda_{max}$=594 and 640 nm (H$_2$O)), which dyes cotton in blue hues by the dyeing or printing processes customary for reactive dyestuffs.

Further blue anthraquinone dyestuffs having similar properties are obtained by condensing the anthraquinone components listed below of the general formula

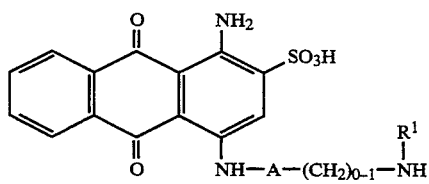

with the trihalogenotriazines and the components of the formula (V) by one of the methods described above.

| No. | —NH—A—(CH$_2$)$_{0-1}$—NH(R$^1$) | Trihalogenotriazine | Component of the formula (V) | Hue | $\lambda_{max}$ (H$_2$O) |
|---|---|---|---|---|---|
| 14 | —NH—⟨phenyl(SO$_3$H)⟩—CH$_2$—NH(CH$_3$) | 2,4,6-trifluoro-1,3,5-triazine | HN(phenyl)—(CH$_2$)$_2$—SO$_2$—CH$_2$—CH$_2$—O—SO$_3$H | blue | 599 nm |
| 15 | —NH—⟨phenyl(NH$_2$, SO$_3$H)⟩ | 2,4,6-trifluoro-1,3,5-triazine | " | blue | |
| 16 | —NH—⟨phenyl(CH$_3$, CH$_3$, CH$_3$, CH$_2$—NH$_2$, SO$_3$H)⟩ | 2,4,6-trifluoro-1,3,5-triazine | " | reddish blue | |
| 17 | —NH—⟨phenyl(SO$_3$H, NH—CH$_3$)⟩ | 2,4,6-trifluoro-1,3,5-triazine | " | blue | |

-continued

| No. | —NH—A—(CH₂)₀₋₁—NH(R¹) | Trihalogenotriazine | Component of the formula (V) | Hue | $\lambda_{max}$ (H₂O) |
|---|---|---|---|---|---|
| 18 | —NH—⟨C₆H₃(SO₃H)(NH₂)⟩ | cyanuric fluoride | HN(C₆H₅)—(CH₂)₂—SO₂—CH₂—CH₂—O—SO₃H | greenish blue | |
| 19 | —NH—⟨C₆H₂(CH₂NH₂)(SO₃H)(CH₃)⟩ | cyanuric fluoride | " | reddish blue | |
| 20 | —HN—⟨C₆H₂(CH₃)(NH₂)(SO₃H)⟩ | cyanuric fluoride | HN(C₆H₄-p-SO₃H)—(CH₂)₂—SO₂—CH₂—CH₂—O—SO₃H | reddish blue | |
| 21 | —HN—⟨C₆H₂(CH₃)(NH₂)(SO₃H)⟩ | cyanuric chloride | HN(C₆H₅)—(CH₂)₂—SO₂—CH₂—CH₂—O—SO₃H | reddish blue | |
| 22 | —NH—⟨C₆H₁₀⟩—NH₂ | cyanuric fluoride | HN(C₆H₄-m-SO₃H)—CH₂CH₂SO₂CH₂CH₂OSO₃H | clear blue | |
| 23 | —NH—⟨C₆H₈(CH₃)(CH₂NH₂)(CH₃)(CH₃)⟩ | cyanuric fluoride | " | clear blue | |

EXAMPLE 24

A neutralised solution of 10 g of the component of the formula

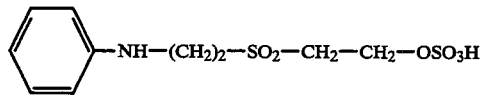

(V)

and 1.6 g of sodium fluoride in 60 ml of water is cooled to 0° to 2° C. 5.5 g of cyanuric fluoride are run in while maintaining the pH between 3.5 to 4.0 using 2N sodium carbonate solution. After condensation is complete, the pH is brought to 5.0.

32 g of the copper phthalocyanine component of the formula

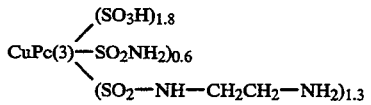

prepared by the procedure given in European Patent Specification 0,073,267, are dissolved in 300 ml of water at a pH of 7.0 to 7.5. The solution of the above condensation product is then run into the dyestuff component at 0° to 5° C. while maintaining the pH in the reaction mixture at 7.0 to 7.5. After 3 hours, the temperature is allowed to gradually rise to 20° C. while still keeping the pH constant. After the reaction is complete, the product obtained is salted out from the solution, filtered off with suction, buffered with a small amount of phosphate solution at a pH of 6.0 and dried at 45° C. in vacuo. The dyestuff has the formula

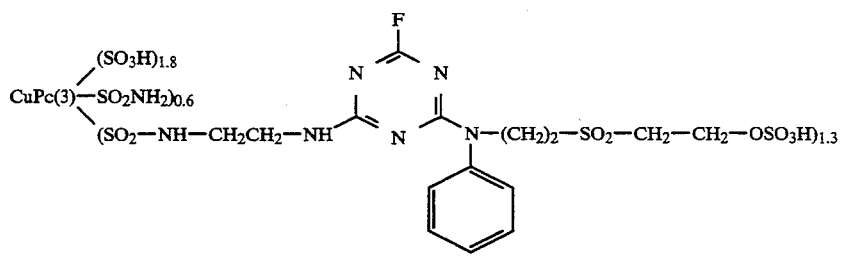

and produces on cotton level turquoise blue dyeings and prints of high tinctorial strength ($\lambda_{max}$ (H$_2$O): 620 nm and 665 nm) by the processes known for reactive dyestuffs.

Further phthalocyanine reactive dyestuffs are obtained by condensing the phthalocyanine components, trihalogenotriazines and components of the formula (V) listed in the compilation below with one another using the method described in Example 20.

and 2.1 g of sodium fluoride are condensed with 7.5 g of cyanuric fluoride.

22.1 g of the triphendioxazine compound of the formula

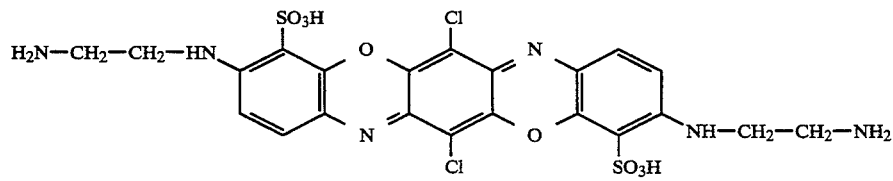

are dissolved in 300 ml of water at a pH of 11.5 to 12 by addition of sodium hydroxide solution.

This solution and that of the reactive components prepared above are simultaneously added dropwise to 80 ml of initially introduced ice water while maintaining

| No. | Phthalocyanine component | Trihalogeno-triazine | Component of the formula (V) | Hue | $\lambda_{max}$ (H$_2$O) |
|---|---|---|---|---|---|
| 25 | NiPc(3)—(SO$_3$H)$_{2.5}$, (SO$_2$—NH—CH$_2$—CH$_2$—NH$_2$)$_{1.3}$ | F,F,F-triazine | HN—(CH$_2$)$_2$—SO$_2$—(CH$_2$)$_2$—OSO$_3$H (phenyl) | bluish green | 621 nm and 664 nm |
| 26 | CuPc(3)—(SO$_3$H)$_{2.9}$, SO$_2$—NH—(phenyl-SO$_3$H)—NH$_2$ | F,F,F-triazine | " | turquoise | 623 nm and 666 nm |
| 27 | CuPc(3)—(SO$_3$H)$_{2.9}$, SO$_2$—NH—(phenyl)—NH$_2$ | F,F,F-triazine | " | turquoise | |
| 28 | CuPc(3)—(SO$_3$H)$_{2.4}$—(SO$_2$NH$_2$)$_{0.5}$, SO$_2$—NH—(phenyl)—NH$_2$ | F,F,F-triazine | " | turquoise | |

EXAMPLE 29

According to Example 1A, 14 g of N-phenyl-N-$\beta$-($\beta$-sulphatoethylsulphonyl)-ethylamine in 80 ml of water the pH in the reaction mixture at 8 to 8.5 with 2N sodium hydroxide solution and still maintaining the temperature at 0° to 2° C. After several hours, the reaction is complete. The temperature is allowed to rise to 20° C. overnight. The dyestuff is salted out, filtered off with suction and, after buffering to a pH of 6.7, dried at 45° C. in vacuo. It has the formula

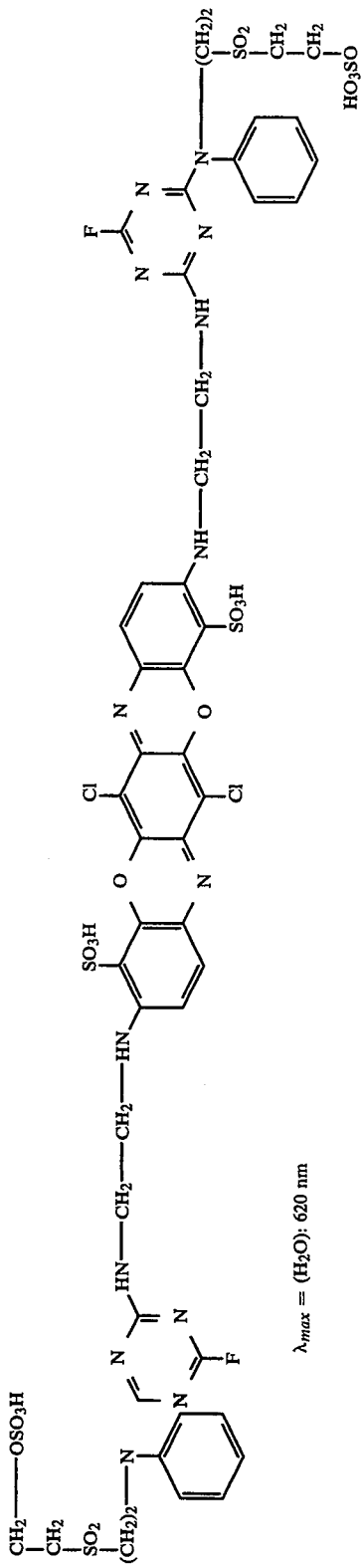

and dyes cotton by the customary methods in strong blue hues and good fixation yields.

EXAMPLE 30

50 g of the triphendioxazine compound of the formula

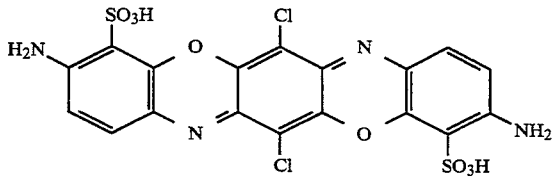

are dissolved in 2000 ml of water by bringing the pH to 7.0 with 10% strength lithium hydroxide solution.

The solution is cooled to 0° to 5° C., and a solution of the reactive component prepared in Example 1A (250 ml) is added dropwise. After warming to 20° C., the condensation reaction is carried out at a pH of 7.0 to 8.0 for about 2 to 3 hours, and the product is salted out, isolated and dried.

The dyestuff obtained of the formula

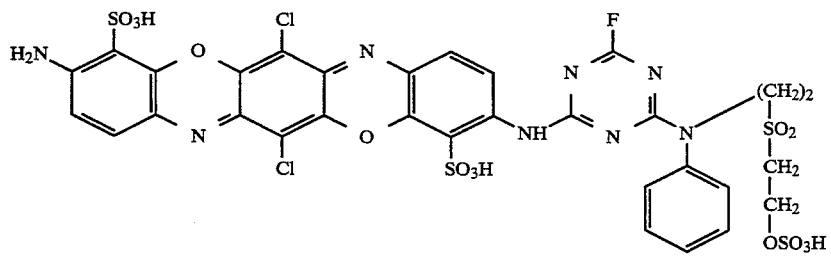

dyes cotton from a long liquor in strongly reddish blue hues ($\lambda_{max}$ ($H_2O$): 580 nm).

Further triphendioxazine reactive dyestuffs are prepared by a procedure analogous to that of Examples 25 and 26 by condensation of the following components:

| | Triphendioxazine component | Trihalogenotriazine | Component of the formula (V) | Hue | $\lambda_{max}$ (H$_2$O) |
|---|---|---|---|---|---|
| 31 | H$_2$N—CH$_2$—CH$_2$—HN—[triphendioxazine]—NH—CH$_2$—CH$_2$—NH$_2$ | trifluorotriazine | HN—(CH$_2$)$_2$—SO$_2$—(CH$_2$)$_2$—OSO$_3$H, m-SO$_3$H-phenyl | blue | 619 nm |
| 32 | H$_2$N—(CH$_2$)$_3$—NH—[triphendioxazine]—NH—(CH$_2$)$_3$—NH$_2$ | trifluorotriazine | " | blue | 615 nm |
| 33 | H$_2$N—(CH$_2$)$_3$—NH—[triphendioxazine]—NH—(CH$_2$)$_3$—NH$_2$ | trifluorotriazine | NH—(CH$_2$)$_2$—SO$_2$—(CH$_2$)$_2$—OSO$_3$H, phenyl | | 620 nm |
| 34 | NH$_2$—CH$_2$—CH$_2$—O—[triphendioxazine]—O—CH$_2$—CH$_2$—NH$_2$ | trifluorotriazine | " | bluish red | |
| 35 | H$_2$N—CH$_2$—CH$_2$—HN—[triphendioxazine]—NH—CH$_2$—CH$_2$—NH$_2$ | trichlorotriazine | HN—(CH$_2$)$_2$—SO$_2$—(CH$_2$)$_2$—OSO$_3$H, phenyl | blue | 619 nm |

-continued

| | Triphendioxazine component | Trihalogenotriazine | Component of the formula (V) | Hue | $\lambda_{max}$ (H$_2$O) |
|---|---|---|---|---|---|
| 36 | H$_2$N—(CH$_2$)$_3$—NH—[triphendioxazine]—NH—(CH$_2$)$_3$—NH$_2$ | dichlorotriazine (Cl, N, Cl, N, Cl) | " | blue | 617 nm |
| 37 | H$_2$N—[triphendioxazine]—NH$_2$ | dichlorotriazine (Cl, N, Cl, N, Cl) | " | blue | 582 nm |

EXAMPLE 38

3 mol of 2-phenylaminoethanol of the formula

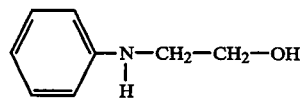

were added dropwise to 1400 parts of 100% strength sulphuric acid at 20° to 30° C. over a period of 1 hour. Stirring was continued for 2 hours. The melt thus obtained was poured onto ice at 0° C., and the mixture was additionally stirred at 0° to 5° C. for 1 hour. The precipitated product was isolated, giving about 1500 parts of the ester as a light beige paste having the following formula:

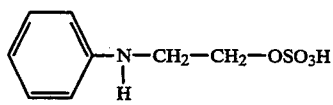

The entire paste was suspended in 2500 parts of water and brought to a pH of 7 with 50% strength potassium hydroxide solution. 3 mol of mercaptoethanol was added dropwise at 60° C. over a period of 20 minutes, followed by dropwise addition of 3 mol of potassium hydroxide (50% strength solution). The mixture was refluxed for 8 hours. The resulting oil was separated off. The aqueous phase was extracted by shaking with ether. After distilling off the ether, the product-containing residues were combined, giving 460 parts of the thio compound as an oil of the formula

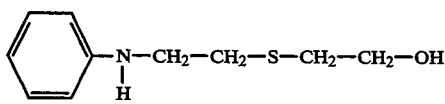

$^1$H NMR(D$_6$-DMSO)
$\delta = 2.58$–$2.75$ ppm (6H, m)
$\delta = 3.22$ ppm (2H, t)
$\delta = 4.80$ ppm (1H, s)
$\delta = 6.50$–$6.61$ ppm (3H, m)
$\delta = 7.05$ ppm (2H, d)

EXAMPLE 39

460 parts of the thio ether were taken up in 1000 parts of acetone and 1000 parts of water. 2.6 mol of acetic anhydride were added dropwise over a period of 1 hour. The temperature rose to about 45° C. Stirring was continued for 2 hours, and 14 g of sodium tungstate were added. This was followed by dropwise addition of 4.9 mol of 35% strength H$_2$O$_2$ over a period of 1 hour. The temperature rose to 50° to 55° C. The acetone was distilled off, and the remaining solution cooled to 10° C. The resulting product precipitated and was isolated, giving 1020 parts of a paste having the following formula:

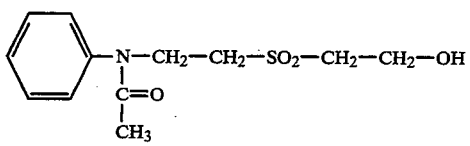

$^1$H NMR(D$_6$-DMSO)
$\delta = 1.77$ ppm (1H, s)
$\delta = 3.21$–$3.38$ ppm (4H, m)
$\delta = 3.76$ ppm (2H, q)
$\delta = 4.05$ ppm (2H, t)
$\delta = 5.10$ ppm (1H, t)
$\delta = 7.38$–$7.55$ ppm (5H, m)

EXAMPLE 40

1020 parts of the paste were suspended in 1500 parts of water, and 300 parts of 30% strength hydrochloric acid were added. The mixture was refluxed for 3 hours. The solution was cooled to 10° C. and brought to a pH of 9 with sodium hydroxide solution. The oil obtained was separated off. The aqueous phase was extracted by shaking with ethyl acetate. After distilling off the ethyl acetate, the fractions of the resulting oil of the formula

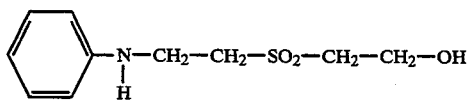

were combined and dried, giving 450 parts of the sulphone as an oil.

$^1$H NMR (D$_6$-DMSO)
$\delta = 3.23$–$3.55$ ppm (6H, m)
$\delta = 3.85$ ppm (2H, t)
$\delta = 5.30$ ppm (1H, s)
$\delta = 5.78$ ppm (1H, t)
$\delta = 6.60$ ppm (3H, d)
$\delta = 7.10$ ppm (2H, t)

EXAMPLE 41

450 parts of the above substance were added dropwise to 1800 parts of sulphuric acid at 20° to 30° C. over a period of 1 hour. After 8 hours, the melt was poured onto ice, and the mixture was additionally stirred at 0° to 5° C. for about 1 hour. The light beige, crystalline product was isolated, giving 910 parts of a paste. The resulting compound has the following formula:

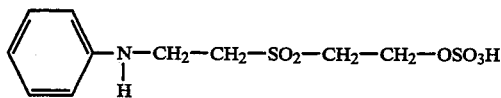

The overall yield is 45 to 50%. (Examples 38 to 41).
$^1$H NMR (D$_6$-DMSO )
$\delta = 3.43$ ppm (2H, t)
$\delta = 3.50$ ppm (2H, t)
$\delta = 3.60$ ppm (2H, t)
$\delta = 4.11$ ppm (2H, t)
$\delta = 7.00$ ppm (3H, d)
$\delta = 7.30$ ppm (2H, t)
$\delta = 8.98$ ppm (2H, s)

We claim:

1. Reactive dyestuff which, in the form of the free acid, has the following formula

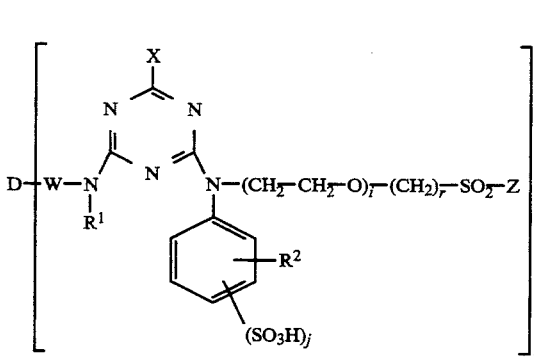

in which
D is the radical of an organic dyestuff from the anthraquinone, phthalocyanine, formazan, azomethine, dioxazine, phenazine, stilbene, triphenylmethane, xanthene, thioxanthone or nitroaryl series,
W is a direct bond or a bridging member
$R^1$ is H, $CH_3$ or $C_2H_5$
$R^2$ is H, $C_1-C_4$-alkyl, Cl, Br, $C_1-C_4$-alkoxy or COOH
i is 0 or 1
j is 0, 1 or 2
r is 2 or 3
X is F, Cl or Br
Z is $-CH=CH_2$, $-CH_2-CH_2-OSO_3H$, $-CH_2-CH_2-S_2O_3H$, $-CH_2-CH_2-O-CO-CH_3$, $-CH_2-CH_2-OPO_3H_2$, $-CH_2-CH_2-OH$,
n is 1 or 2.

2. Reactive dyestuff according to claim 1, wherein the radical D contains one or more water-solubilising groups and/or no further fibre-reactive radicals.

3. Reactive dyestuff according to claim 1, which, in the form of the free acid, has the following formula:

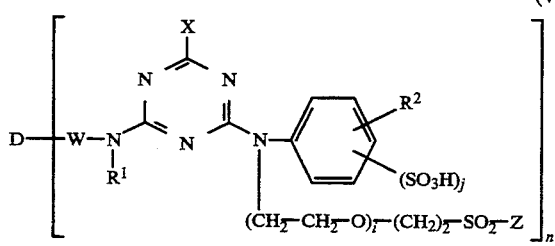

in which
D is the radical of an organic dyestuff from the anthraquinone, phthalocyanine, formazan, azomethine, dioxazine, phenazine, stilbene, triphenylmethane, xanthene, thioxanthone or nitroaryl series,
$R^2$ is H, $CH_3$ or $C_2H_5$,
$R^1$ is H or $CH_3$, $C_2H_5$,
W is a direct bond or a bridging member,

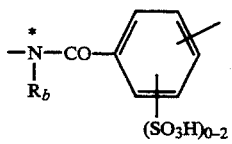

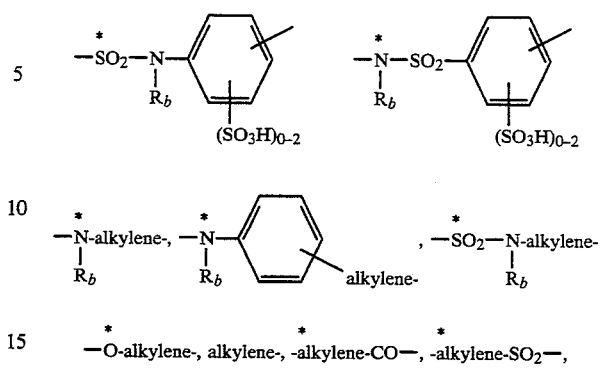

* designating the atom or the group linked to the chromophore D,
i is 0 or 1,
j is 0 or 1,
X is F or Cl
Z is $CH_2-CH_2-OSO_3H$, $CH=CH_2$,
n is 1 or 2.

4. Reactive dyestuff according to claim 1 of the formula

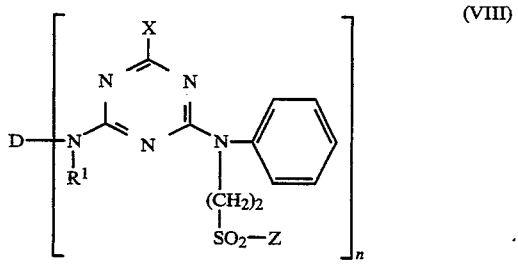

in which
D is the radical of an organic dyestuff from the anthraquinone, phthalocyanine, formazan or dioxazine series, which dyestuff contains no further fibre-reactive groups,
X is F, Cl,
Z is $CH_2-CH_2-OSO_3H$,
$R^1$ is H, $CH_3$ or $C_2H_5$,
n is 1.

5. Reactive dyestuff according to claim 1 of one of the following formulae, where B is a radical of the formula

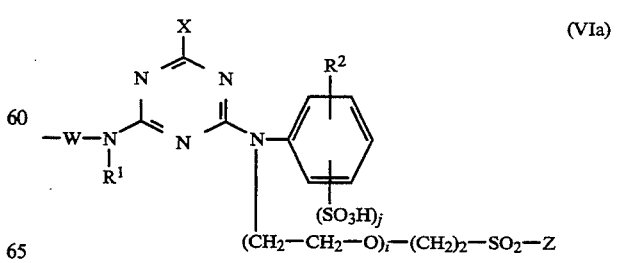

in which the substituents have the meaning given in claim 1,

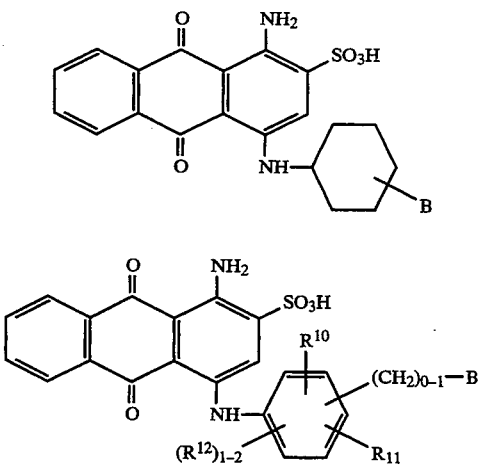

(1)

(2)

in which
R¹⁰ is H, methyl, methoxy, chlorine
R¹¹ is H, SO₃H and
R¹² is H, methyl or ethyl,

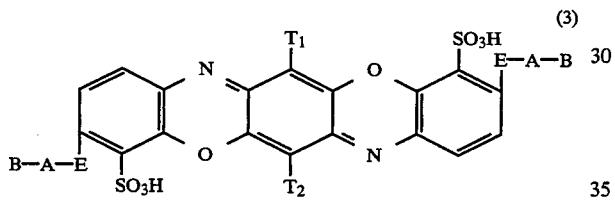

(3)

in which
A represents a substituted or unsubstituted phenylene or a substituted or unsubstituted aromatic-aliphatic bridging member or straight-chain or branched $C_1$-$C_6$-alkylene which may be interrupted by groupings containing hetero atoms such as $NR^{13}$, O or S and substituted by $C_1$-$C_6$-alkoxy, $OSO_3H$, $SO_3H$, COOR or halogen, it also being possible for the group $NR^{13}$ within a bridging member A to form a heterocyclic aliphatic ring with the group $NR_b$, E is

or O and

T₁, T₂, independently of one another, are H, Cl, Br, $C_1$-$C_2$-alkyl, OCH₃, OC₂H₅, acylamino, $C_1$-$C_2$-alkoxycarbonyl, R¹³, R¹⁴, independently of one another, are H, $C_1$-$C_4$-alkyl, which may be substituted by OR, $OSO_3H$, $SO_3H$, COOR or halogen, R is H, CH₃ or C₂H₅,

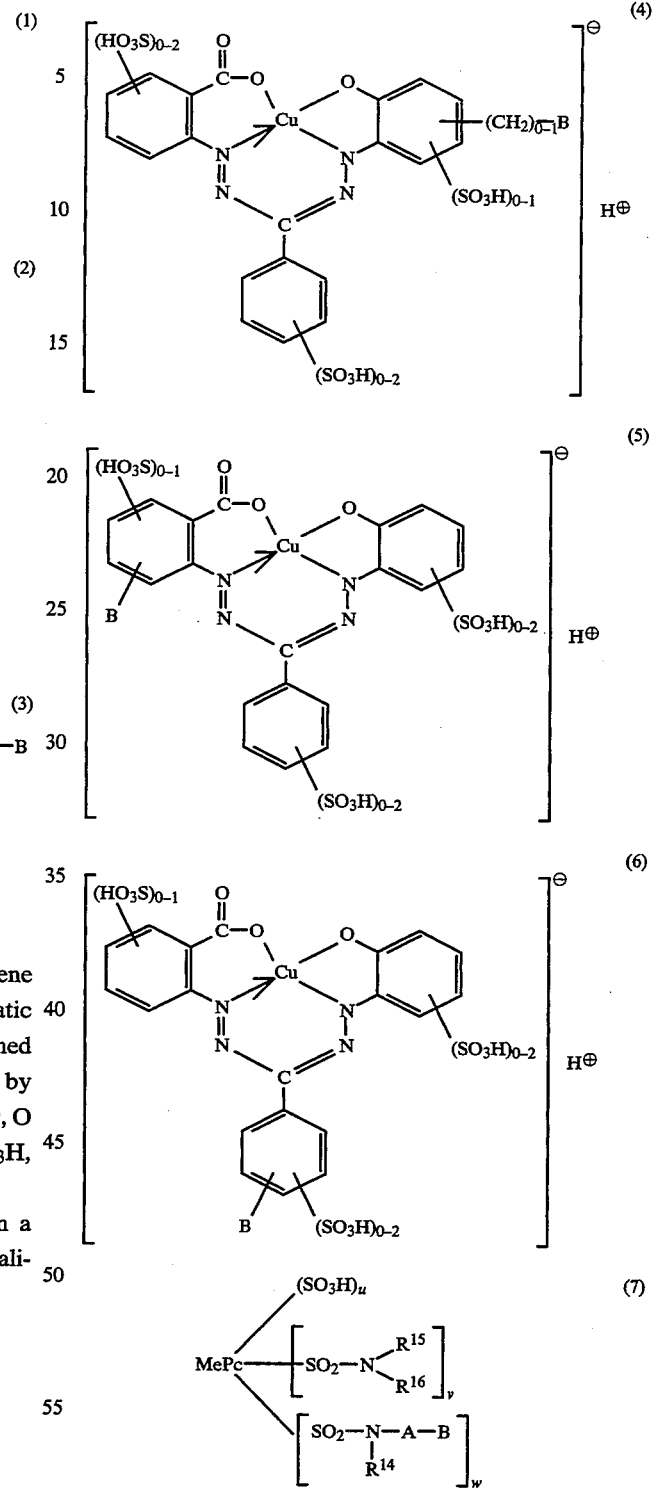

in which
Me is Cu, Ni
Pc is the radical of a phthalocyanine
u+v+w is 3.4–4.0, with the proviso that
u is 0.8–2.0,
v is 0–1.0,
w is 1.0–3.0 and
A has the abovementioned meaning,
R¹⁴ has the abovementioned meaning, $R^{15}$ and $R^{16}$ are H, $C_1$-$C_2$-alkyl which is unsubstituted or substituted by OH, $OSO_3H$, $SO_3H$ or COOH,

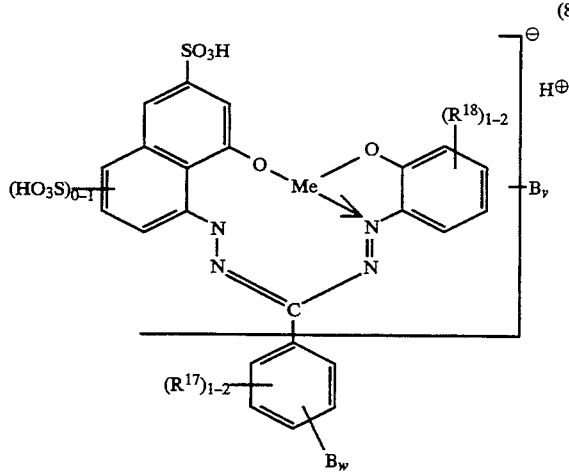
(8)

in which v, w are 0 or 1, w not being equal to v, $R^{18}$, $R^{17}$, independently of one another, are H, $C_1$-$C_4$-alkyl, $C_1$-$C_4$-alkoxy, OH, halogen, COOH, $NO_2$, $SO_3H$, sulphonamido, $C_1$-$C_4$-alkylcarbonylamino, substituted or unsubstituted phenylcarbonylamino, $C_1$-$C_4$-alkylsulphonylamino, substituted or unsubstituted phenylsulphonylamino.

6. Reactive dyestuff according to claim 5, in which
X is F,
i is 0,
j is 0 or 1,
Z is $CH_2$—$CH_2$—$OSO_3H$, $CH$=$CH_2$
$R^2$ is H.

7. Reactive dyestuffs according to claim 5, in which
X is F
i is 0
j is 0
Z is $CH_2$—$CH_2$—$OSO_3H$
$R^2$ is H.

8. The reactive dyestuff according to claim 1, wherein i is 1.

9. Process for the dyeing or printing of cellulose-containing or polyamido-containing materials with a reactive dyestuff by applying thereto a reactive dyestuff according to claim 1.

* * * * *